United States Patent [19]

Kahlman et al.

[11] Patent Number: 5,661,710
[45] Date of Patent: Aug. 26, 1997

[54] RECORD CARRIER, RECORDING DEVICE AND READING DEVICE

[75] Inventors: Josephus A. H. M. Kahlman; Gerard E. Van Rosmalen, both of Eindhoven, Netherlands

[73] Assignee: U.S. Philips Corporation, New York, N.Y.

[21] Appl. No.: 530,818

[22] Filed: Sep. 20, 1995

[30] Foreign Application Priority Data

Sep. 21, 1994 [EP] European Pat. Off. .............. 94202709

[51] Int. Cl.⁶ .................................................. G11B 3/74
[52] U.S. Cl. .................... 369/97; 369/32; 369/275.3
[58] Field of Search .......................... 369/275.1–275.4, 369/97, 32

[56] References Cited

U.S. PATENT DOCUMENTS 3,337,694  8/1967  Nakamatsu ..................... 369/97
5,171,984  12/1992  Van Rosmalen ................. 250/561
5,191,221  3/1993  Van Rosmalen et al. ........ 250/236

FOREIGN PATENT DOCUMENTS 57-212647  12/1982  Japan ......................... 369/97
9104556  4/1991  WIPO .

Primary Examiner—Nabil Hindi

[57] ABSTRACT

A tape-like record carrier (109) is disclosed which comprises paths (A, B). Each path (A, B) contains substantially parallel tracks (1) the path width (1s) in length and the direction of the tracks is transverse to the longitudinal direction of the path (A, B). The diameters (10) of the paths have various directions. The ends of the paths (1) are overlapping. In these overlapping areas the tracks (1) belonging to the various paths are positioned in interlineated manner. Said record carrier (109) is advantageous in that no time is lost during recording or reading when a path is changed. Furthermore, a recording and reading device is disclosed which are applicable in combination with the record carrier.

7 Claims, 5 Drawing Sheets

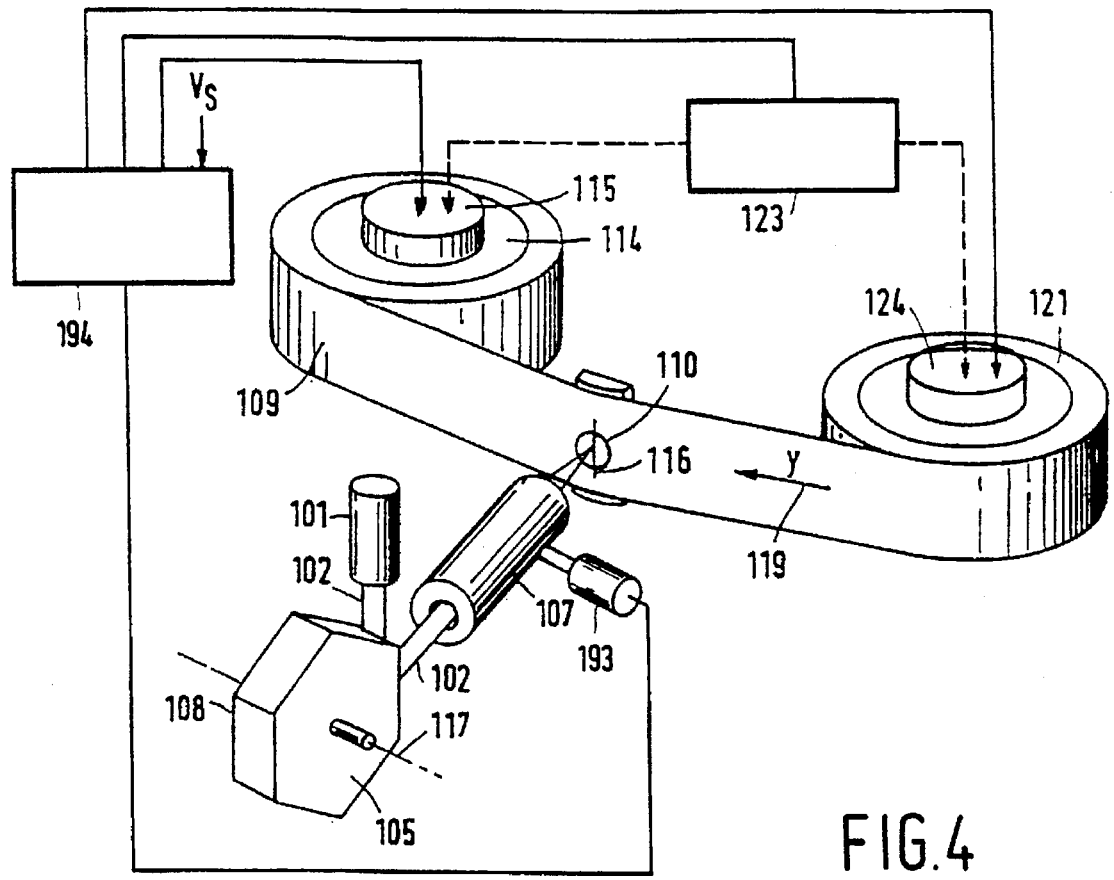
FIG.4
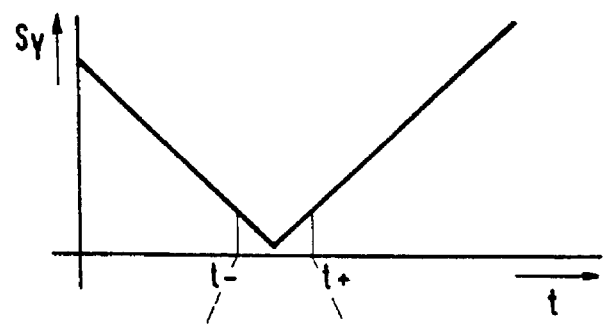
FIG.5a
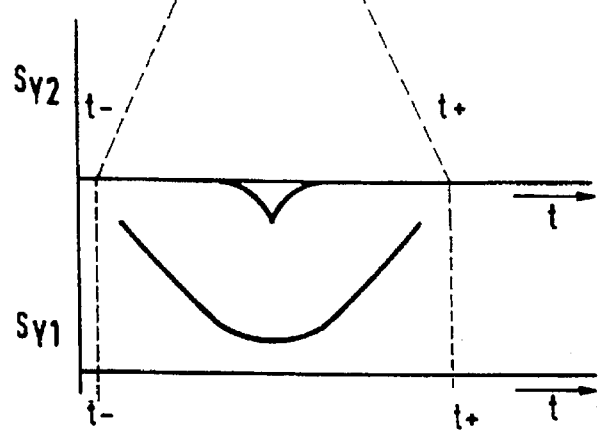
FIG.5b
FIG.5c

1

RECORD CARRIER, RECORDING DEVICE AND READING DEVICE

BACKGROUND OF THE INVENTION

The invention relates to a record carrier having paths, in which each path has substantially parallel tracks having a length equal to the path width, and the direction of the tracks is transverse to the longitudinal direction of the path.

The invention further relates to a recording device for recording an information track at the location of a scanning spot on the record carrier and displacing means for displacing the record carrier from the scanning spot in a direction of displacement transverse to a longitudinal direction of the information track.

The invention finally relates to a reading device for reading paths of information tracks on a record carrier, reading means for reading an area of the record carrier located at a scanning spot on the record carrier, positioning means for positioning a next information track of the path on the scanning spot, which positioning means comprise displacing means for displacing the record carrier in accordance with a line determined by the diameter of one of the paths.

A record carrier, a recording device and a reading device of said types are known from WO 91/04556.

Above document discloses a record carrier in the form of an optically writable tape. When information is recorded, the surface of the tape is recurrently scanned in a direction transverse to the longitudinal direction of the tape by a modulated laser beam focused at the recording surface via an optical system. The tape is then moved in longitudinal direction relative to the optical system, so that a path in the longitudinal direction of the tape is provided with parallel information tracks. The length of the tracks is only a fraction of the width of the tape. To cover the entire width of the tape, paths containing parallel tracks are realised on the tape. Once the tape has moved a certain distance in longitudinal direction, the recording is stopped, the tape is moved in a direction transverse to the longitudinal direction over a distance slightly larger than the length of the tracks, after which the tape is moved back in longitudinal direction and the recording of a next path of parallel tracks is commenced.

In this manner, a plurality of parallel-arranged paths of relatively short information tracks are recorded on the tape.

When the tape is read out, it is moved to and fro in longitudinal direction while one of the paths is read out each time the tape is moved in either direction.

The objection to the known recording and reading procedure is that once an end of one of the paths is reached during reading/recording, the tape is to be moved in a transverse direction before the next path can be read out or recorded. This displacement of the tape in a transverse direction is relatively time-consuming. During this period of time no information can be read out or recorded. This is especially an objection in the case where the information is to be presented or produced as a continuous data stream.

SUMMARY OF THE INVENTION

It is an object to the invention to provide a record carrier for which recording and reading need not be interrupted so long when an end of one of the paths is reached.

According to the invention, this object is achieved in that various paths whose centerlines have partly different directions are locally overlapping and in that the tracks of the overlapping areas of the paths are interlineated. As a result of the interlineation it is not necessary when the direction of rotation of the tape is reversed to move the tape in transverse direction before the recording and reading can be resumed. Because the directions of the centerlines are different, the recording/reading position may move in the direction transverse to the longitudinal direction in a gradual manner, so that it becomes possible to record a plurality of adjacent paths.

An embodiment for the record carrier is characterized in that path centerlines establish at least one closed loop. This enables the information recorded in the paths whose centerlines form a loop to be read out recurrently without interruption.

A further embodiment for the record carrier is characterized in that path centerlines establish a grid. This embodiment is advantageous in that each time a grid point (point of intersection of two centerlines) is reached, a selection can be made from various possibilities for a continuation of the reading operation, without the need for interrupting the reading operation. When a program is read out (for example, an audio or video program), it becomes simply possible to modify the course of the program when a grid point is passed, which affords considerable advantages for programs with interactive applications.

A recording device according to the invention is characterized in that the displacing means are arranged for displacing the scanning spot in a second direction of displacement intersecting the first direction of displacement, in that a control means is provided for effecting a change from one to the other direction of displacement and in that means are provided for effecting that the information tracks are recorded in between information tracks recorded prior to a change of direction once the direction of displacement has been changed.

An embodiment for the recording device is characterized in that the displacing means are longitudinal displacing means for effecting longitudinal displacements transverse to the direction of the tracks and transverse displacing means for effecting displacements in a direction transverse to the longitudinal direction, the longitudinal displacing means comprise a first displacement actuator which has a first delay for a scanning spot displacement in a first displacement area and a second displacement actuator which has a second delay for a scanning spot displacement in a second displacement area smaller than the first area, and the delay of the second actuator is smaller than the delay of the first actuator and the control means effects the change of direction of displacement basically with the aid of the second actuator.

By utilizing the two actuators for the longitudinal displacements, it is possible to have an extremely fast reversal of the scanning spot in longitudinal direction.

A reading device according to the invention is characterized in that the reading device comprises means for effecting a change of displacement along the centerline of a first path to a displacement along the centerline of a second path when an intersection of the diameter of the first path with the centerline of the second path is reached.

A further embodiment for the reading device is characterized in that the displacing means are longitudinal displacing means for effecting longitudinal displacements transverse to the direction of the tracks and transverse displacing means for effecting displacements in a direction transverse to the longitudinal direction, the longitudinal displacing means comprise a first displacement actuator which has a first delay for a scanning spot displacement in a first displacement area and a second displacement actuator which has a second delay for a scanning spot displacement in a second displacement area smaller than the first area, and the delay of the second actuator is smaller than the delay of the first actuator and the control means effects the change of direction of displacement basically with the aid of the second actuator.

By utilizing the two actuators for the displacement in longitudinal direction, an extremely fast reversal of the scanning spot displacement in longitudinal direction can be obtained.

The invention will be further described below with reference to the drawing.

BRIEF DESCRIPTION OF THE DRAWING

FIGS. 2 and 4 show embodiments for recording and reading devices according to the invention, and FIGS. 3 and 5 show displacement curves.

DESCRIPTION OF THE PREFERRED EMBODIMENT

Figure 1A:
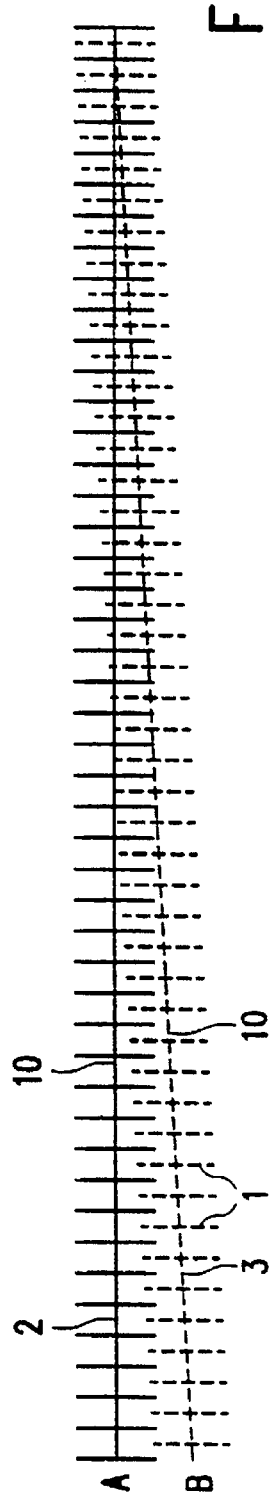
FIGS. 1a, 1b, 6a, 6b, 7, 8 and 9 show path patterns for different embodiments for the record carrier.

FIG. 1a shows a pattern of paths as they may be realised on a record carrier according to the invention. The pattern shows two paths referenced A and B. Each path contains substantially parallel tracks 1 which have a length equal to the path width and have a track direction transverse to a longitudinal direction of the associated path A or B. The tracks 1 of path A are shown in solid lines while the tracks 1 of path B are shown in broken lines. Reference characters 2 and 3 denote the centerlines of the paths i.e. the lines connecting the centres of the tracks of a particular path. The centerlines 2 and 3 have different directions. At the ends the paths A and B are overlapping. The tracks of the overlapping areas of paths A and B are interlineated which is to say that track belonging to path B lies in between two tracks belonging to path A and vice versa.

Figure 1B:
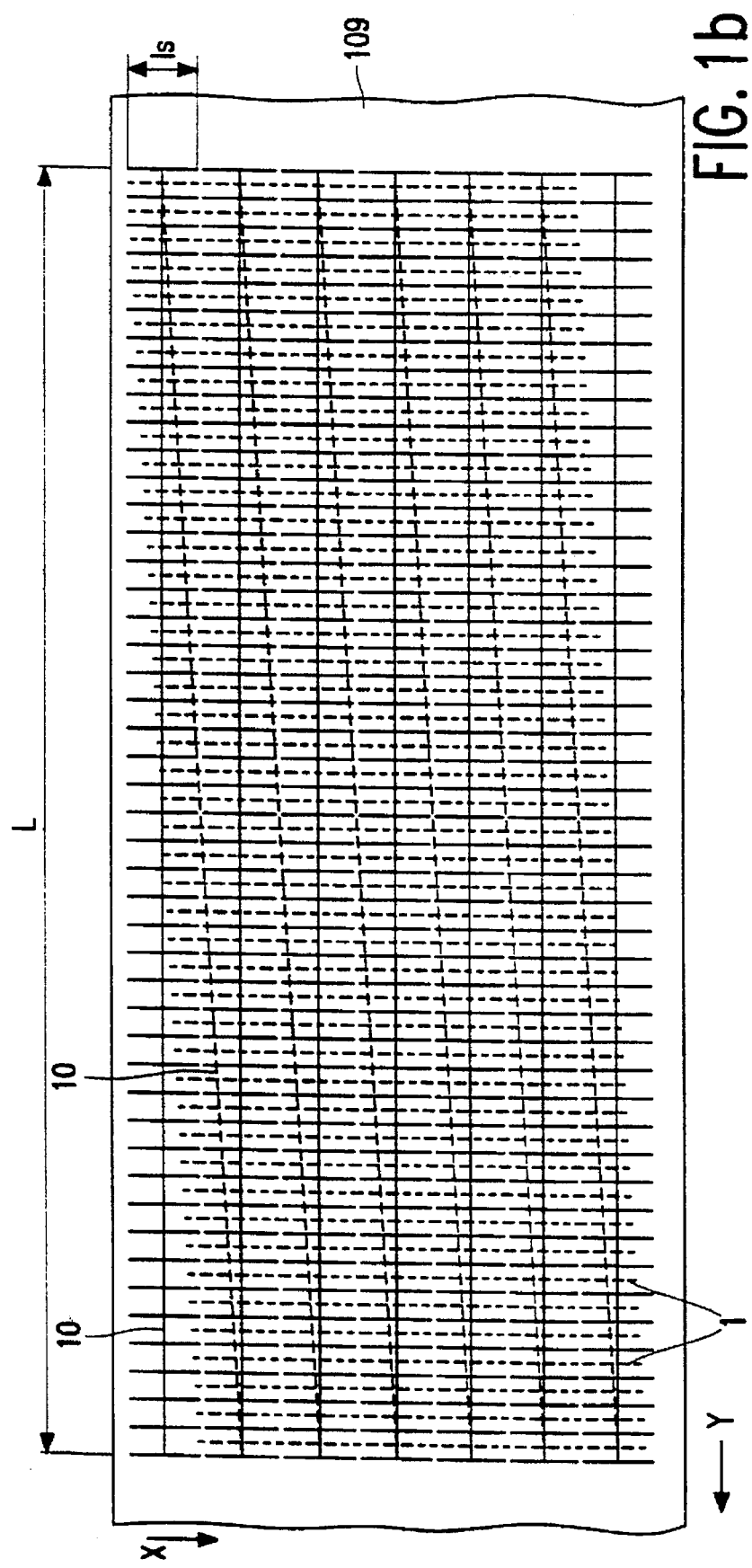

FIG. 1b shows a pattern of paths which has a similar structure to the pattern shown in FIG. 1a, but in which the number of paths is increased. The directions of the paths are again determined by centerlines 10 connecting the centres of the information tracks. These diameters form a zigzag pattern. The tracks 1 of overlapping paths are again interlineated.

Figure 9:
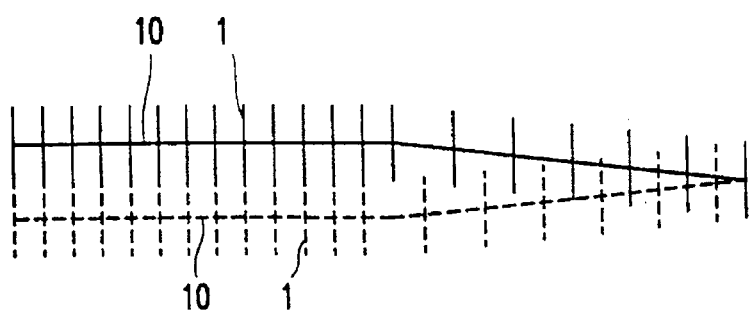

In FIG. 1b the paths over the entire length of the recorded area are partly overlapping. It should be observed, however, that it is alternatively possible for these paths to be overlapping only at the ends and for the remaining areas of the paths not to overlap other paths. By way of illustration FIG. 9 shows such a pattern of paths. In such a pattern of paths it is advantageous to let the track pitch (distance between the tracks of the same path) in the non-overlapping areas of the paths be half the track pitch in the overlapping areas, so that a proper information density is obtained throughout the record carrier.

Figure 2:
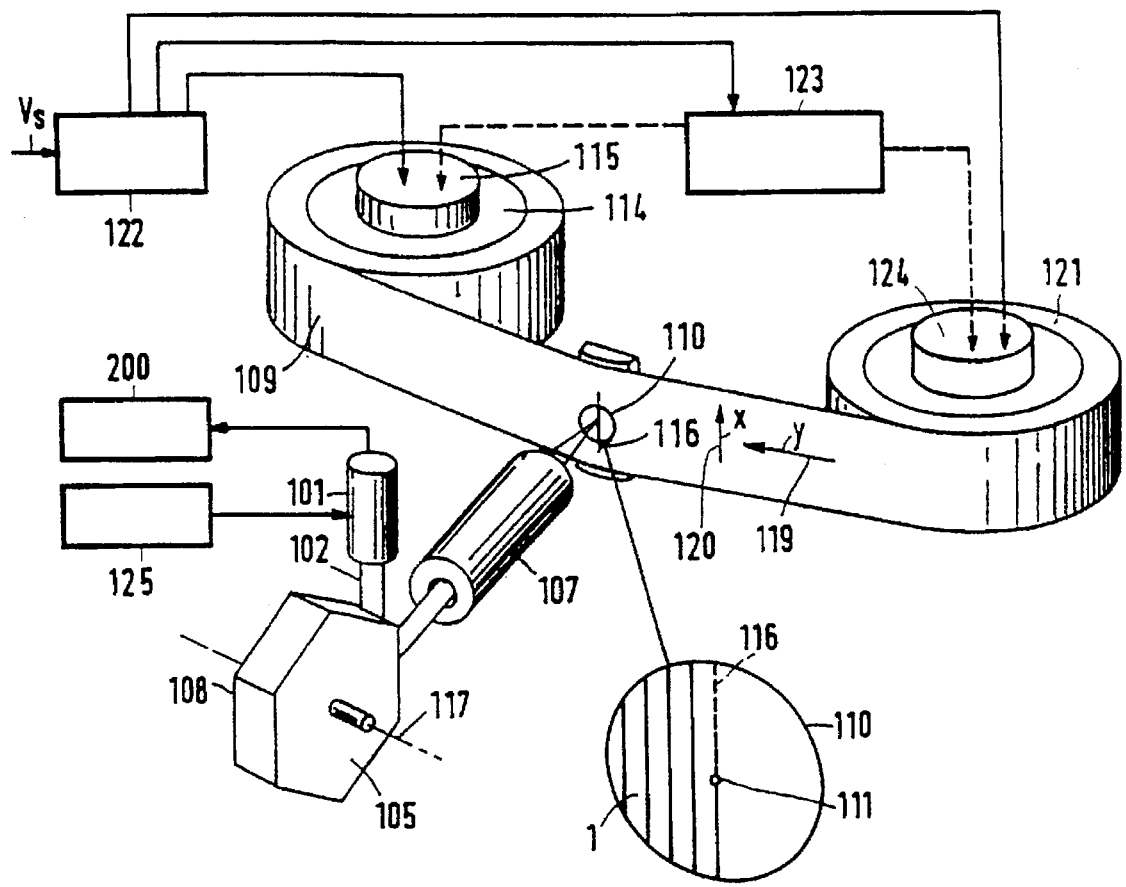

FIG. 2 shows by way of example a device by which the pattern shown in FIG. 1 can be introduced on a tape-like record carrier 109 which is wound on reels 114 and 121.

The device shown comprises recording means for recording an information track on a part of the tape that is scanned. This part will further be referenced by the term of scanning spot. For realising the information tracks, the scanning means comprise an optical scanning system which re, currently scans a line determined by the scanning spot and having the length of the tracks 1. This optical scanning system may be of a customary type. In the embodiment shown the optical scanning system comprises a lightwave 101, a rotary polygon mirror 105 and a focusing objective 107. The lightwave 101 is of a type as is customarily used in optical or magnetooptical recording and/or reading devices. Such a lightwave comprises generating means for generating a radiation beam 102. The radiation beam 102 is focused via the polygon mirror 105 and the focusing objective 107 at a recording layer of the tape 109. The recording layer may be made of a radiation-sensitive material which undergoes an optically detectable change under the influence of the radiation coming from the radiation beam 102. This recording layer may be of a magnetooptical or optical type. The radiation beam 102 is focused by the focusing objective 107 to a very small scanning spot 111 on the recording layer of the record carrier 109. An area 110 on the recording surface where the radiation beam 102 hits the recording layer is shown in detail. In the area 110 shown in detail the scanning spot 111 shown is caused by the radiation beam 102.

The polygon mirror 105 has reflecting facets 108 and is rotated around an axis 117 by customary driving means (not shown) which are extensively described, for example, in U.S. Pat. No. 5,171,984 (PHN 13.343) and EP-A 0 459 586, which documents are deemed incorporated herein by reference. The polygon mirror 105 is positioned relative to the lightwave 101 so that, on rotation of the polygon mirror 105 around the axis of rotation 117, the radiation beam 102 always hits a next facet of the facets 108, so that the recording layer is recurrently scanned by the scanning spot 111 and the scanning spot 111 follows a scanning path 116.

In response to an information signal fed to the lightwave 101 by an information signal source 125, the radiation beam can be modulated in a customary fashion for the purpose of introducing an information pattern in the scanned area.

The recording device shown in FIG. 2 further includes longitudinal displacing means for displacing the record carrier 109 relative to the optical system in a direction y indicated by an arrow 119 transverse to the direction of the scanning path 116. These displacing means may be of a customary type which are shown diagrammatically in FIG. 2 and which comprise the reels 114 and 121, driven by the motors 115 and 124, for winding up the tape-like record carrier 109 which is transported in the direction y. The recording device further includes transverse displacing means for displacing the tape 109 in a direction x indicated by an arrow 120 transverse to the longitudinal direction of the track 109. These transverse displacing means may comprise a motor 123 of a customary type for effecting a transverse displacement of the tape 109 relative to the optical system, for example, by means of a displacement of tape 109 and/or a displacement of the optical system. For clarity, the motor 123 is shown oily diagrammatically in FIG. 2.

Figure 3:
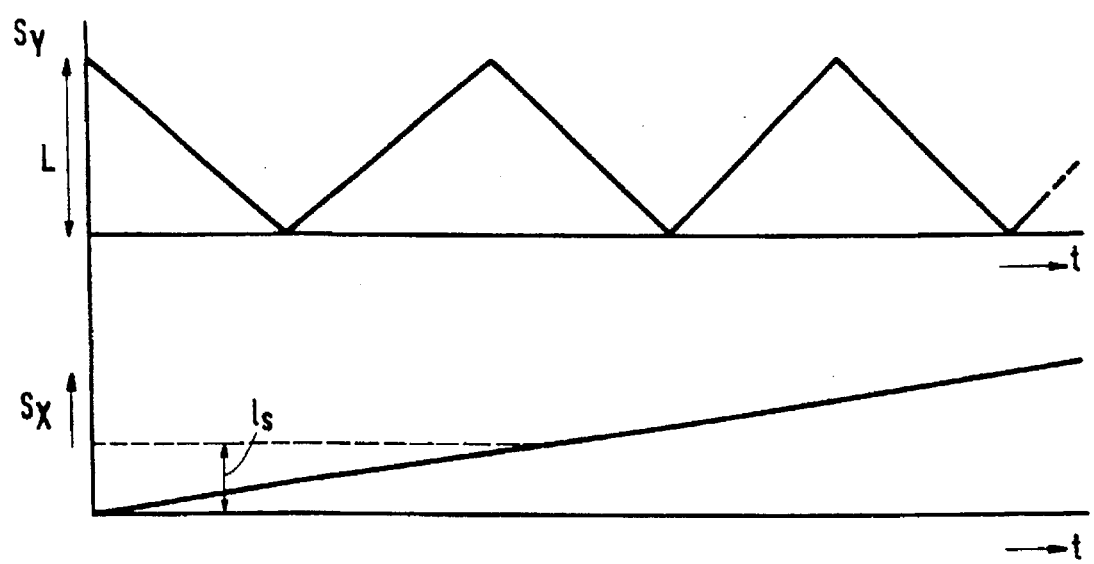

A control means 122 controls the tape displacement Sy effected by the motors 115 and 124 in the direction y and the tape displacement Sx effected by motor 123 in the direction x as is shown in FIG. 3 in the displacement curves plotted against time t.

The tape is moved to and fro over a distance L (cf. FIG. 1b) by means of the motors 115 and 124. The tape 109 is continuously moved in the same direction by means of motor 123. In each time interval in which the tape is moved in the y direction over a distance L, the tape is moved in the x direction over a distance equal to half the path width 1s.

As a result, the scanning spot on tape 109 will be subject to a composite movement in which a zigzag-like path is covered that corresponds to the zigzag pattern formed by the centerlines 10 in FIG. 1b.

With each displacement in the y direction over the distance L, a path of tracks 1 is defined. The instants at which the velocity in the y direction is changed at the end of the paths are selected such that the newly realised tracks are located in between the tracks of the previous path.

The displacement of Sx and Sy may be controlled in various ways by means of feedforward or feedback control systems. For example, it is possible when information tracks of the very first path are recorded to control the velocity in the y direction in response to a signal which is indicative of the track pitch of the recorded tracks. For a detailed description of such a control, reference be made to European Patent Application no. 94202393.8 (PHN 14.960) or 94202394.6 (PHN 14.961) which documents are deemed incorporated herein by reference. When the information tracks of subsequent paths are recorded, which paths partly overlap already recorded paths, the position of the information tracks on the newly recorded path may be determined relative to the previously recorded path. These newly recorded information tracks are to be located in between the information tracks of the previously recorded path. The velocity in the y direction can be controlled in response to a signal that indicates the position of the newly recorded information tracks relative to the information tracks of the previously recorded path, so that the newly recorded information tracks continue to be located in between the tracks of the previously recorded path. The position of the newly recorded tracks may be determined, for example, by focusing two satellite beams at the tape 109, which satellite beams are focused at the edges of the adjacent information tracks when the newly recorded track has a correct position. In the field of optical recording systems such a positioning is also referenced three-spot track positioning.

Another option for deriving the position of the newly recorded tracks is described in Belgian Patent Application 09301395 (PHN 14.671).

The advantage of afore-described recording method is that substantially no time is lost during the transition from one path to the other, so that the information signal supply to the lightwave 101 need not be interrupted. When the displacements Sy as shown in FIG. 3 are effected, the direction of displacement is reversed each time after the scanning spot has moved over a distance L. The direction of the displacement of the reels 114 and 121 is then reversed too. Due to the relatively large volume of the reels 114 and 121, the motors 115 and 124 and the tape 109 wound on the reels, the reversal may be relatively slow which imposes restrictions on the velocity with which the direction of displacement of the scanning spot can be reversed.

FIG. 4 shows an embodiment for the scanning device in which the scanning spot can be reversed considerably faster in the y direction.

In this embodiment the components corresponding to those shown and described earlier carry like reference characters. To effect the displacement Sy, the displacing means are extended by a unit for influencing an element in the optical system, so that the scanning spot is adjusted in the y direction. This element may consist, for example, of the objective 107 which can be displaced in the y direction within a restricted area by means of a customary-type high-speed actuator 193. However, it should be observed that such a displacement can also be obtained with other deflection elements which are arranged elsewhere in the optical system and which can effect a deflection of the radiation beam 102. In the embodiment shown in FIG. 5 the position Sy is determined by the sum of the displacement Sy1 caused by the motors 115 and 124 and the displacement Sy2 caused by the high-speed actuator 193. By reversing the direction of displacement, a very fast reversal can be effected by the high-speed actuator. FIG. 5 shows by way of illustration a possible curve of the displacements Sy1 and Sy2 when the direction of displacement is reversed. Curve a shows the desired displacement pattern for the displacement Sy. In the time interval between t− and t+, the direction of displacement is reversed. Curves b and c show the behaviour of Sy1 and Sy2 along an extended time scale. The direction of displacement Sy1 caused by the motors 115 and 124 is reversed relatively slowly. The difference between the desired displacement Sy and the actual displacement Sy1 is compensated by the displacement Sy2 effected by the high-speed actuator.

To obtain the displacement profiles shown in FIG. 5, the device comprises a control means 194 which to this end drives the motors 115 and 124 and the actuator 193 in a customary fashion. The control means 194 likewise controls the motor 123 to effect the displacement of the scanning spot Sx in the x direction as is shown in FIG. 1b.

The devices shown in FIGS. 2 and 4 may also be used for reading the information. The information can be read by letting the scanning spot on the tape follow the lines prescribed by the centerlines, under the control of the control means 122 or 194 for the respective embodiments of FIG. 2 and FIG. 4. The radiation beam 102 then scans the information tracks 1 during which operation the beam is modulated in accordance with the recorded information. From this modulated radiation beam it is then possible to reconstitute the recorded information in customary fashion by means of a detection circuit 200 connected to a detector inserted into the lightwave 101, which detector detects the radiation beam modulated by the information tracks 1.

To obtain an accurate tracking during the reading operation, feedback tracking controls may be added to the devices. These feedback tracking controls may be of a customary type as are known by the terms of push-pull tracking and three-spot tracking. Tracking controls as known from previously mentioned Belgian Patent Application no. 09301395 (PHN 14.671) are also applicable.

Figure 6A:
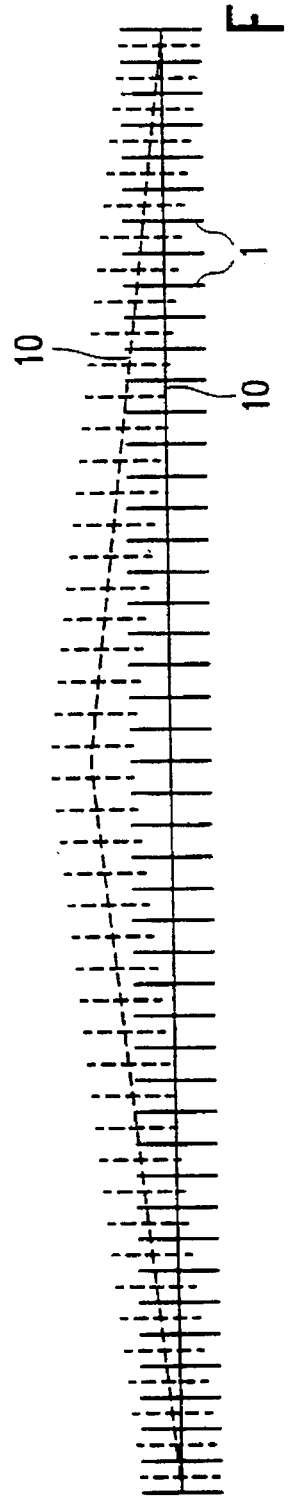

FIG. 6a shows a pattern of paths of information tracks 1 in which the diameters 10 establish a closed loop. Such a pattern is advantageous in that the information available in the paths may be recurrently read out without interruptions.

Figure 6B:
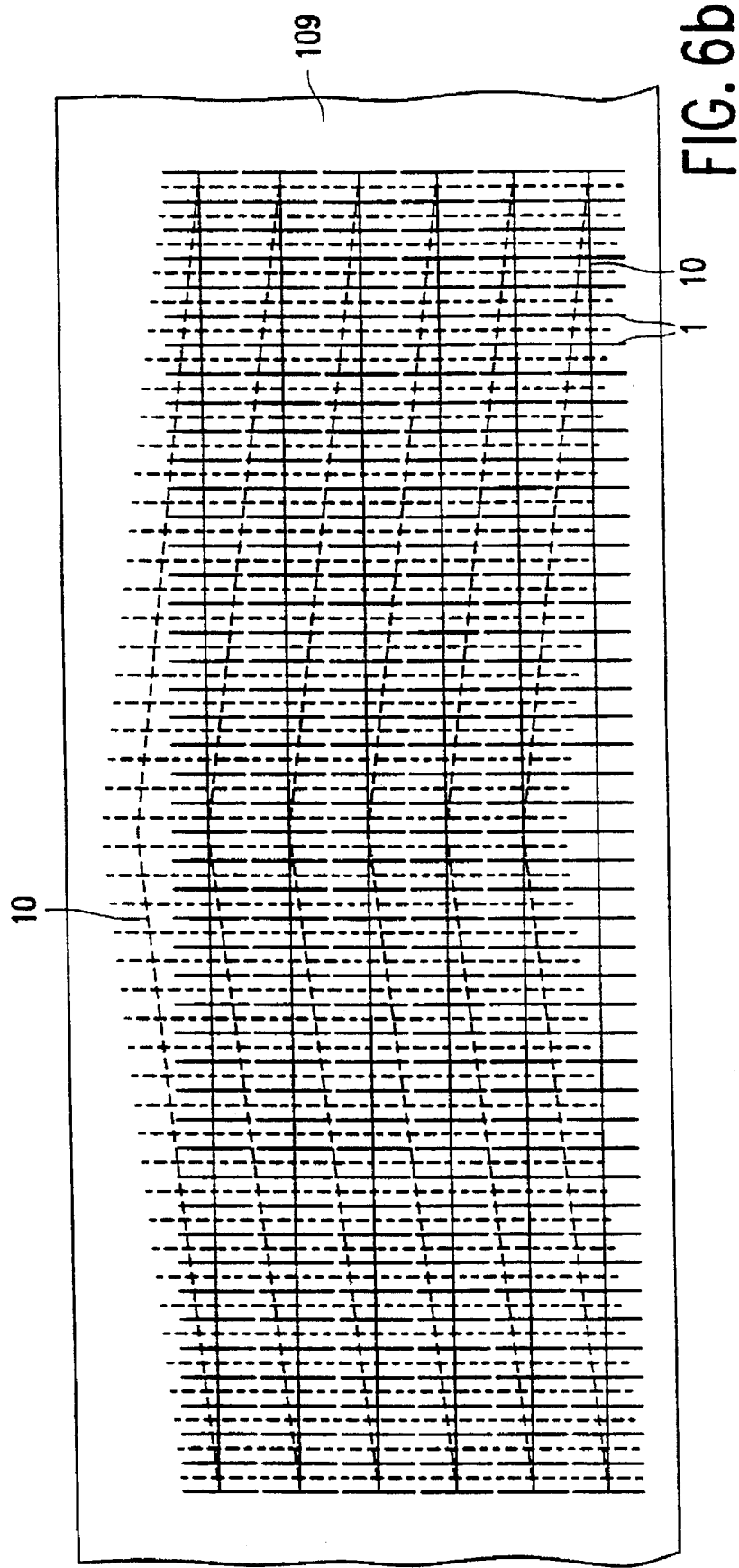
Figure 7:
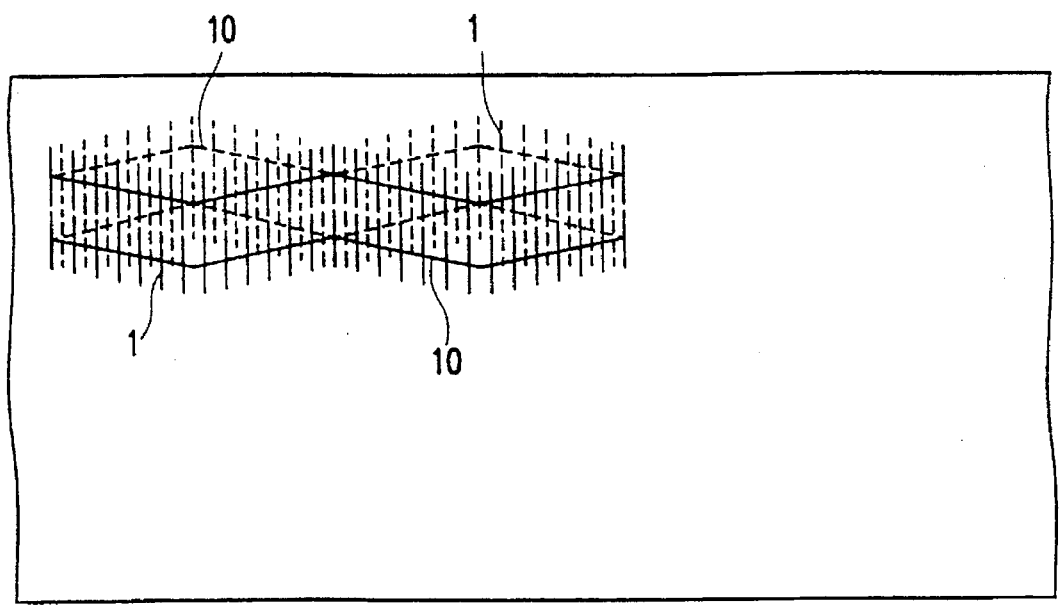

FIG. 6b shows an elaboration of the pattern shown in FIG. 7 in which the whole width of the tape 109 is utilized for recording purposes.

FIG. 7 shows a path pattern in which the centerlines 10 establish a grid.

This pattern is advantageous in that each time the scanning spot reaches a point of the grid, a selection can be made from various possibilities for the continuation of the reading operation, without the need for interrupting the reading operation. When a program is read (for example, an audio or video program), it is thus simply possible to alter the course of the program with each passage of a point of the grid, which affords great advantages for programs of interactive applications. The control means may thereto comprise a selection means which effects a displacement of the scanning spot in a direction determined by the selection signal in response to a supplied selection signal Vs when the scanning spot reaches a grid point.

Figure 8:
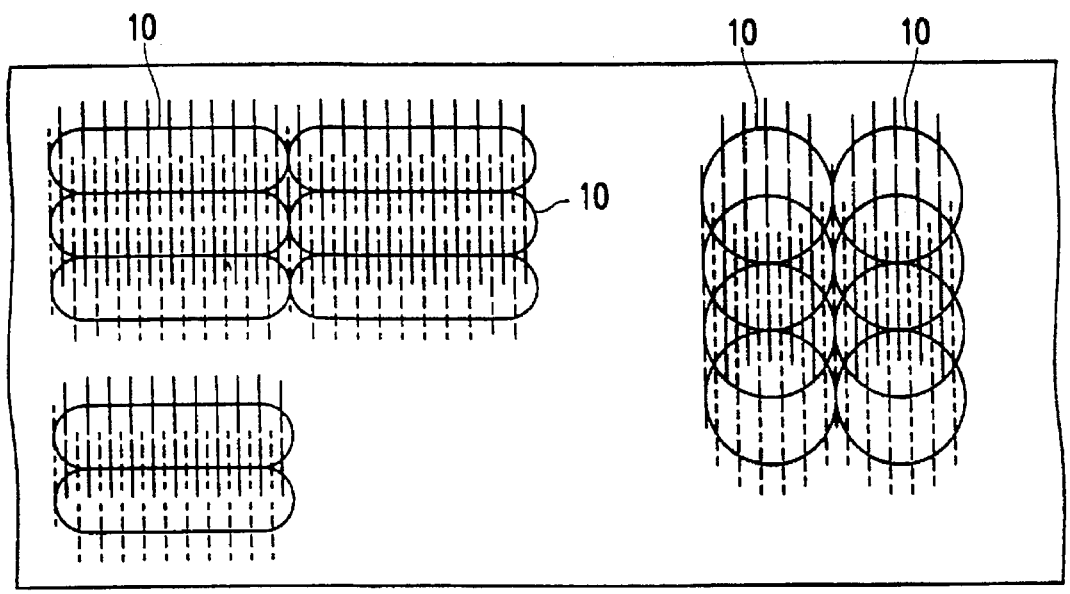

FIG. 8 shows different path patterns in which the centerlines 10 establish grids.

The path patterns shown in FIGS. 6 to 8 may be recorded by the devices shown in FIGS. 2 and 4 in similar fashion to the path patterns shown in FIGS. 1a and 1b. Thereto, the displacement profiles Sy and Sx effected by the control means 122 or 194 need only be adapted in such a way that the scanning spot follows a line formed by the centerlines 10 of the desired path pattern.

In the path patterns shown in FIGS. 6 to 8 the displacements Sx are also reversed. For the path patterns shown in FIGS. 6 and 7 these reversals are abrupt, which poses stringent requirements on the bandwidth of the transverse displacing means. On the other hand, the path pattern shown in FIG. 8 is advantageous in that these reversals may also be realised with a gradual reversal of the directions of displacement in the x direction, and thus less stringent requirements need to be posed on the bandwidth of the transverse displacing means.

The invention is explained with reference to an optical recording/reading device for recording/reading information on a tape-like record carrier. It will be obvious to those skilled in the art that the invention is not restricted to tape-like record carriers, but that this invention can also be applied to different record carriers, for example, disc-like record carriers. Neither is the invention restricted to the application to optical recording and reading systems, but can it also be applied to different recording/reading systems, for example, of a magnetic type.

Finally, an observation may be made that the invention is described with reference to embodiments in which two paths are partly overlapping, in which the information tracks are located in interlineated fashion in the overlapping areas. However, the invention is not restricted to these embodiments. Embodiments comprising three or more overlapping paths in which the information tracks of all these three or more partly overlapping paths are located in interlineated fashion, are likewise possible.

We claim:

1. A recording device for recording an information track at the location of a scanning spot on the record carrier, comprising displacing means for displacing the record carrier from the scanning spot in a direction of displacement transverse to a longitudinal direction of the information track, characterized in that the displacing means are arranged for displacing the scanning spot in a second direction of displacement intersecting the first direction of displacement, and the device further comprises:

control means for changing from one direction of displacement to the other direction of displacement, and means, responsive to a change in the direction of displacement, for recording information tracks in between information tracks recorded prior to the change in the direction.

2. A recording device as claimed in claim 1, characterized in that the control means is arranged to effect displacements along a line that establishes a closed loop.

3. A recording device as claimed in claim 1, characterized in that the tracks are recorded such that centerlines of the tracks establish a grid.

4. A recording device as claimed in claim 1, characterized in that the displacing means are longitudinal displacing means for effecting longitudinal displacements transverse to the direction of the tracks and transverse displacing means for effecting displacements in a direction transverse to the longitudinal direction, the longitudinal displacing means comprise a first displacement actuator which has a first delay for a scanning spot displacement in a first displacement area and a second displacement actuator which has a second delay for a scanning spot displacement in a second displacement area smaller than the first area, and the delay of the second actuator is smaller than the delay of the first actuator and the control means effects the change of direction of displacement basically with the aid of the second actuator.

5. A reading device for reading paths of information tracks on a record carrier, comprising:

reading means for reading an area of the record carrier located at a scanning spot on the record carrier, and position means for positioning a next information track of the path on the scanning spot, wherein said positioning means comprises displacing means for displacing the record carrier along a line determined with respect to the centerline of one of the paths, characterized in that the reading device further comprises means for changing displacement along the centerline of a first path to a displacement along the centerline of a second path when an intersection of the centerline of the first path with the centerline of the second path is reached.

6. A reading device as claimed in claim 5, characterized in that the control means comprises selection means for selecting a line to be followed at instants at which the predetermined spot on the record carrier relative to the recording means corresponds to a point of intersection of two path centerlines.

7. A reading device as claimed in claim 5, characterized in that the displacing means are longitudinal displacing means for effecting longitudinal displacements transverse to the direction of the tracks and transverse displacing means for effecting displacements in a direction transverse to the longitudinal direction, the longitudinal displacing means comprise a first displacement actuator which has a first delay for a scanning spot displacement in a first displacement area and a second displacement actuator which has a second delay for a scanning spot displacement in a second displacement area smaller than the first area, and the delay of the second actuator is smaller than the delay of the first actuator and the control means effects the change of direction of displacement basically with the aid of the second actuator.

* * * * *